United States Patent
Qiao et al.

(10) Patent No.: US 11,486,614 B2
(45) Date of Patent: Nov. 1, 2022

(54) COMPRESSOR AND REFRIGERATION DEVICE

(71) Applicant: GUANGDONG MEIZHI COMPRESSOR CO., LTD., Foshan Guangdong (CN)

(72) Inventors: Zhengzhong Qiao, Foshan Guangdong (CN); Fei Xu, Foshan Guangdong (CN); Xiaohua Qiu, Foshan Guangdong (CN); Linshu Mao, Foshan Guangdong (CN); Chaocong Liu, Foshan Guangdong (CN)

(73) Assignee: GUANGDONG MEIZHI COMPRESSOR CO., LTD., Foshan Guangdong (CN)

( * ) Notice: Subject to any disclaimer, the term of this patent is extended or adjusted under 35 U.S.C. 154(b) by 311 days.

(21) Appl. No.: 16/867,710

(22) Filed: May 6, 2020

(65) Prior Publication Data
US 2020/0263908 A1  Aug. 20, 2020

Related U.S. Application Data

(63) Continuation of application No. PCT/CN2018/102029, filed on Aug. 23, 2018.

(30) Foreign Application Priority Data

Jan. 3, 2018 (CN) .......................... 201810005375.5
Jan. 3, 2018 (CN) .......................... 201820007473.8
(Continued)

(51) Int. Cl.
*F25B 31/02* (2006.01)
*F25B 49/02* (2006.01)
(Continued)

(52) U.S. Cl.
CPC .......... *F25B 31/026* (2013.01); *F25B 49/022* (2013.01); *H02K 5/225* (2013.01); *F25B 2600/021* (2013.01); *H02P 6/182* (2013.01)

(58) Field of Classification Search
CPC .............. F25B 2600/021; F25B 31/026; F25B 49/022; H02K 5/225; H02P 6/182
See application file for complete search history.

(56) References Cited

U.S. PATENT DOCUMENTS

2019/0245470 A1* 8/2019 Nigo .......................... F24F 11/88
2019/0245471 A1* 8/2019 Nigo ....................... H02K 1/276
(Continued)

FOREIGN PATENT DOCUMENTS

CN         2233889 Y       8/1996
CN       102007669 A       4/2011
(Continued)

OTHER PUBLICATIONS

Examination Report dated May 7, 2021 received in Indian Patent Application No. IN 202047020106.
(Continued)

*Primary Examiner* — Henry T Crenshaw
(74) *Attorney, Agent, or Firm* — Scully Scott Murphy & Presser (57) ABSTRACT

This present disclosure provides a compressor and a refrigeration device having the compressor. The refrigeration device has a coupling assembly and a frequency converter connected to one end of the coupling assembly. The compressor has a first shell and a permanent magnet motor. The permanent magnet motor is set in the first shell and connected to the other end of the coupling assembly. By designing the relevant parameters of the motor of the compressor, the efficiency of the motor and the compressor can be improved.

10 Claims, 4 Drawing Sheets

| (30) | Foreign Application Priority Data | | | JP | 2001-37186 A | 2/2001 |
|------|------|------|------|------|------|------|
| | | | | JP | 2006-246674 A | 9/2006 |
| Apr. 8, 2018 | (CN) | ......................... | 201810308108.5 | JP | 2008-228513 A | 9/2008 |
| Apr. 8, 2018 | (CN) | ......................... | 201820487751.4 | JP | 2016-099029 A | 5/2016 |
| | | | | JP | 2016-131444 A | 7/2016 |
| | | | | JP | 2016-158418 A | 9/2016 |
| | | | | WO | 2010/064402 A1 | 6/2010 |

(51) Int. Cl.
    *H02K 5/22*         (2006.01)
    *H02P 6/182*       (2016.01)

(56) References Cited

U.S. PATENT DOCUMENTS

2020/0021222 A1*   1/2020   Nigo ........................ F25B 13/00
2020/0021224 A1*   1/2020   Nigo ........................ H02P 25/18

FOREIGN PATENT DOCUMENTS

| CN | 107171522 A | 9/2017 |
|----|-------------|--------|
| CN | 107370257 A | 11/2017 |
| CN | 107425625 A | 12/2017 |
| CN | 108288938 A | 7/2018 |
| CN | 208028805 U | 10/2018 |
| JP | H04-281383 A | 10/1992 |

OTHER PUBLICATIONS

Extended European Search Report dated Nov. 18, 2020 received in European Patent Application No. EP 18897970.2.

First Office Action dated Apr. 11, 2019 received in Chinese Patent Application No. CN 201810308108.5 together with an English language translation.

International Search Report dated Nov. 19, 2018 received in International Application No. PCT/CN2018/102029 together with an English language translation.

Notice of Reasons for Refusal dated Jun. 22, 2021 received in Japanese Patent Application No. JP 2020-526512 together with an English language translation.

\* cited by examiner

COMPRESSOR AND REFRIGERATION DEVICE

CROSS-REFERENCES TO RELATED APPLICATIONS

The present disclosure claims the priority of Chinese Patent Application No. 201810308108.5, filed with the Chinese Patent Office on Apr. 8, 2018 and entitled "COMPRESSOR AND REFRIGERATION DEVICE", and the priority of Chinese Patent Application No. 201810005375.5, filed with the Chinese Patent Office on Jan. 3, 2018 and entitled "COMPRESSOR AND REFRIGERATION DEVICE", and the priority of Chinese Patent Application No. 201820487751.4, filed with the Chinese Patent Office on Apr. 8, 2018 and entitled "COMPRESSOR AND REFRIGERATION DEVICE", and the priority of Chinese Patent Application No. 201820007473.8, filed with the Chinese Patent Office on Jan. 3, 2018 and entitled "COMPRESSOR AND REFRIGERATION DEVICE", the entire contents of which are herein incorporated by reference for all purposes. No new matter has been introduced.

FIELD

The present disclosure relates to the field of compressor manufacturing technology, and specifically to a compressor and a refrigeration device including the compressor.

BACKGROUND

Compressors are important and core components of refrigeration devices. The related technology proposed a winding switching scheme, that is, when the a compressor's motor is running at a low speed, the compressor's stator winding is in a star connection, and when the compressor's motor is running at a high speed, the compressor's stator winding is in a triangle connection. However, the related technology does not involve the design of related parameters of the compressor's motor. If the motor parameters are not properly designed, it will result in low comprehensive efficiency of the motor, a small expansion range, and poor user experience.

SUMMARY

The present disclosure aims to solve at least one of the technical problems existing in the prior art or related technologies.

To this end, the first aspect of the present disclosure proposes a compressor.

The second aspect of the present disclosure proposes a refrigeration device.

In view of this, the first aspect of the present disclosure proposes a compressor for a refrigeration device, the refrigeration device comprising a coupling assembly and a frequency converter connected to one end of the coupling assembly, wherein the compressor comprises: a first shell; and a permanent magnet motor being set in the first shell and connected to the other end of the coupling assembly; a critical rotation speed of the permanent magnet motor is n0; a number of poles of the permanent magnet motor is P; when a winding of the permanent magnet motor is a star connection, a busbar voltage of the frequency converter is Udc, a no-load back-EMF coefficient of the permanent magnet motor is E0, when a preset rotation speed of the permanent magnet motor is n1, a direct axis inductance of the permanent magnet motor is Ld, and an output current of the frequency converter is I1, a relationship between the E0, the P, the I1, the Ld, the n1, and the Udc satisfies $(E0-P \times I1 \times Ld) \times n1 \geq 0.6$ Udc, wherein $n1 < n0$, and $n0 - n1 \leq 1 r/s$, when the winding of the permanent magnet motor is in the star connection, a rotation speed of the permanent magnet motor is less than the n0.

The critical rotation speed of the permanent magnet motor of the compressor provided by the present disclosure is n0. When the winding of the permanent magnet motor is in the star connection, the rotation speed of the permanent magnet motor is less than n0. When the winding of the permanent magnet motor is in an angle connection, the rotation speed of the permanent magnet motor is greater than n0. Under the premise that the winding of the permanent magnet motor is in the angle connection, a relationship between E0, P, I1, Ld, n1 and Udc can be set reasonably to satisfy $(E0-P \times I1 \times Ld) \times n1 \geq 0.6$ Udc, making the permanent magnet motor also have high efficiency performance at low speed and high speed, so as to achieve the purpose of higher performance of the product in the entire frequency band, further, by properly setting the preset rotation speed n1, the rotation speed $n1 < n0$, and $n0 - n1 \leq 1 r/s$. When the rotation speed n1 is close to the critical rotation speed n0, the permanent magnet motor with winding in the star connection mode has a certain field weakening angle, and the performance of the permanent magnet motor decreases with increasing speed, when the rotation speed of permanent magnet motor is greater than the critical rotation speed n0, and is very close to the critical rotation speed n0, the permanent magnet motor with winding in the angle connection mode has a weak magnetic field. The performance of the permanent magnet motor increases with the increasing speed, so as to ensure that it has a certain field weakening depth, near the critical rotation speed n0 when in star connection, and it has a certain range of the permanent magnet motor's rotation speed increases without field weakening when in angle connection, so that if the connection mode of the winding of the permanent magnet motor is switched, the switching is smoother, the impact can be greatly reduced, the transition is more stable, the product's operating energy efficiency is improved, and the product's performance and market competitiveness are improved.

According to the compressor of the present disclosure, it may also have the following additional technical features.

In the above-mentioned technical solution, optionally, a value range of the n0 is $n0 \geq 40 r/s$.

In the technical solution, by properly setting the value range of the critical rotation speed n0 to $n0 \geq 40 r/s$, when the rotation speed of the permanent magnet motor is within the critical rotation speed n0, the efficiency of the star connection winding of permanent magnet motor is in a decline mode, and the efficiency of the angle connection winding of the permanent magnet motor is in rising mode, thereby ensuring that the product has higher performance in the entire frequency band. At the same time, if the winding connection method of the permanent magnet motor is switched in the above region, the switching is smoother, the impact can be greatly reduced, the transition is more stable, the product's operating energy efficiency is improved, and the product's performance and market competitiveness are improved.

In any of the above-mentioned technical solutions, optionally, the permanent magnet motor is a three-phase permanent magnet motor.

In the technical solution, the permanent magnet motor is not limited to three-phase permanent magnet motors, but may also be other multi-phase permanent magnet motors.

In any of the above mentioned technical solutions, optionally, the permanent magnet motor comprises: a stator being provided with a stator core and the winding being wound on the stator core; and a rotor being provided in a mounting chamber of the stator, and provided with a rotor core and a permanent magnet being located on the rotor core.

In the embodiment, the stator includes a stator core and a winding, by winding the winding on the stator core, the stator is stationary when the compressor is running, when the current passes through the winding, the stator generates a magnetic field, the rotor includes a rotor core and a permanent magnet, the magnetic pole of the permanent magnet does not change, by setting the permanent magnet on the rotor core, when the compressor is working, the rotor is set in the mounting chamber of the stator, the stator generates a rotating magnetic field, and the rotor is cut by the magnetic field lines in the rotating magnetic field to generate output current, which provides power for the operation of the compressor.

In any of the above-mentioned technical solutions, optionally, a winding of the stator is a three-phase stator winding, a winding of each phase of the stator comprises head joints and tail joints, all the head joints are connected to one terminal of the compressor, all the tail joints are connected to the other terminal of the compressor.

In the embodiment, a winding of each phase of the stator comprises head joints and tail joints, all the head joints of the three-phase stator winding are connected to one terminal of the compressor, all the tail joints of the three-phase stator winding are connected to the other terminal of the compressor, so that the coupling assembly is connected to the two terminals of the compressor respectively. In this way, through the different actions of the coupling assembly, different connection modes of the winding can be achieved, such as star connection and angle connection.

In any of the above-mentioned technical solutions, optionally, the permanent magnet is a rare earth permanent magnet, or the permanent magnet is a ferrite permanent magnet.

In any of the above-mentioned technical solutions, optionally, the rotor core includes slots, and the number of slots is at least one, all the slots are distributed at intervals along the circumferential direction of the rotor core, and the permanent magnets are arranged in the slots.

In the technical solution, a permanent magnet setting scheme of the rotor is specifically limited. By processing slots on the rotor core, it is possible to provide an installation position for the permanent magnet, which facilitates the positioning and assembly of the permanent magnet. At the same time, the structure has fewer processing steps and simple processing technology, low production cost and it is convenient to mass produce.

In any of the above-mentioned technical solutions, optionally, the permanent magnet is cylindrical, and the permanent magnet is sleeved on the outer wall of the rotor core.

In the technical solution, a permanent magnet setting scheme of the rotor is specifically limited. The permanent magnet is sleeved on the outer wall of the rotor core, and the rotor core plays a supporting role, which facilitates the positioning and assembly of the permanent magnet. At the same time, the structure has few processing steps, simple processing technology, low production cost, and it is convenient to mass produce.

The second aspect of the present disclosure provides a refrigeration device, comprising: a second shell; a frequency converter being set in the second shell; the compressor according to the first aspect being provided in the second shell; a coupling assembly being provided in the second shell and connected with the frequency converter and the compressor respectively; and a controller being set in the second shell and connected with the coupling assembly, the frequency converter and the compressor, and being used to control the frequency converter and the compressor, so that a relationship between the E0, the P, the I1, the Ld, the n1 and the Udc satisfies $(E0-P \times I1 \times Ld) \times n1 \geq 0.6$ Udc.

The refrigeration device provided by the present disclosure includes: a second shell, frequency converter, a compressor, a coupling assembly and a controller. By setting the controller to make the winding of the permanent magnet motor in star connection, the controller controls the frequency converter and the compressor, so that a relationship between the E0, the P, the I1, the Ld, the n1 and the Udc satisfies $(E0-P \times I1 \times Ld) \times n1 \geq 0.6$ Udc, thereby ensuring that when the rotation speed of the permanent magnet motor is very close to the critical rotation speed, the permanent magnet motor with star connection of the winding has a certain field weakening depth, and the permanent magnet motor with the angle connection of the winding does not enter the field weakening region, thereby ensuring that the product has high performance in the entire frequency band, and the switching of the winding connection mode of the permanent magnet motor has no stagnation, and the switching is smoother, ensuring the smoothness of the transition.

In the above-mentioned technical solution, optionally, when an input current of the frequency converter is AC, the frequency converter comprises: a rectifier; and an inverter being connected with the rectifier.

In the technical solution, the composition of the frequency converter is determined according to the characteristics of the input current of the frequency converter. When the input current of the frequency converter is AC, the frequency converter includes a rectifier and an inverter, after the input current of the frequency converter is filtered by the rectifier, so that the AC is converted into DC, and the DC is power supplied to the inverter.

In any of the above-mentioned technical solutions, optionally, when an input current of the frequency converter is DC, the frequency converter comprises an inverter.

In the technical solution, the composition of the frequency converter is determined according to the characteristics of the input current of the frequency converter. When the input current of the frequency converter is DC, the frequency converter includes an inverter, which uses the inverter to convert DC power to AC power.

In any of the above-mentioned technical solutions, optionally, the coupling assembly comprises: a selector switch being used to switch a winding of the permanent magnet motor between star connection and angle connection.

In the technical solution, by setting a selector switch, using the selector switch on or off to achieve the connection state of the winding of the permanent magnet motor and the frequency converter, and then achieve the winding of the permanent magnet motor in star connection and the winding of the permanent magnet motor in angle connection. At the same time, the structure setting is convenient for processing, installation and subsequent disassembly, replacement, and has strong interchangeability.

In any of the above-mentioned technical solutions, optionally, the refrigeration device further comprises: a detection device being provided in the second shell and connected with the controller and the compressor.

In the technical solution, by setting a detection device in the second shell and using the detection device to detect the rotation speed of the permanent magnet motor in real time, it provides real-time data for the controller to determine whether the rotation speed of the permanent magnet motor reaches the preset rotation speed n1, which is convenient for the controller to accurately and timely control the movement of other components, thereby ensuring the reliability and accuracy of product use.

Additional aspects and advantages of the present disclosure will become apparent in the following description, or are understood by the practice of the present disclosure.

BRIEF DESCRIPTION OF THE DRAWINGS

The above and/or additional aspects and advantages of the present disclosure will become apparent and readily understood from the following description of embodiments in conjunction with the drawings.

wherein, the corresponding relationship between the reference numerals and component names in FIGS. 1-8 is as follows:

1 compressor, 10 frequency converter, 102 rectifier, 104 inverter, 20 permanent magnet motor, 202 stator, 204 stator core, 206 winding, 208 rotor, 210 rotor core, 212 permanent magnet, 214 head joints, 216 tail joints, 30 second shell, 40 selector switch, 100 refrigeration device, 110 coupling assembly, 120 controller, 130 detection device.

DETAILED DESCRIPTION OF THE DISCLOSURE

In order that the above-mentioned objectives, features and advantages of the present disclosure can be understood more clearly, a further detailed description of the present disclosure will be given below in connection with the accompanying drawings and specific embodiments. It should be noted that the embodiments of the present disclosure and the features in the embodiments can be combined with each other if there is no conflict.

In the following description, numerous specific details are set forth in order to provide a thorough understanding of the present disclosure. However, the present disclosure can also be implemented in other manners than those described herein. Therefore, the protection scope of the present disclosure is not limited to the specific embodiments disclosed below.

A compressor and an refrigeration device, according to certain embodiments of the present disclosure, are shown broadly in FIGS. 1-7 and will be described as follows in details with reference to the figures.

Figure 1:
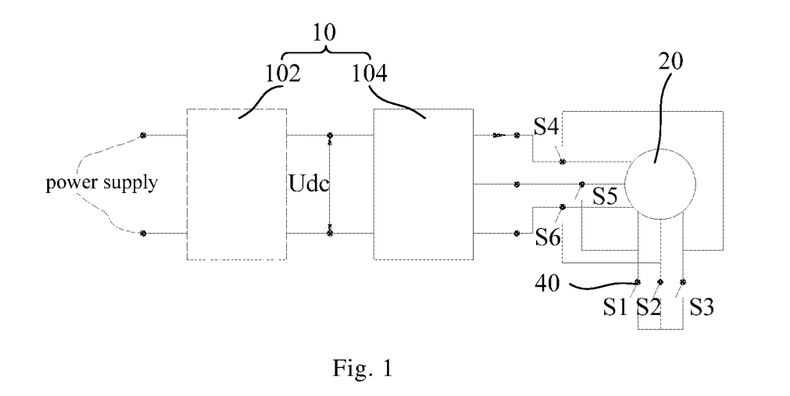
FIG. 1 is a structural schematic diagram of a frequency converter, a permanent magnet motor and a selector switch according to an exemplary embodiment of the present disclosure.
Figure 2:
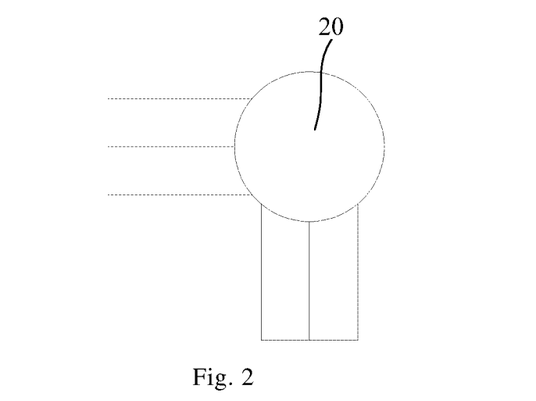
FIG. 2 is a structural schematic diagram of an external wiring of the permanent magnet motor according to an exemplary embodiment of the present disclosure.
Figure 3:
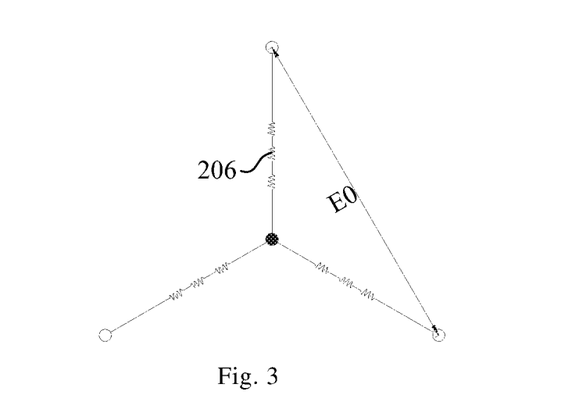
FIG. 3 is a structural schematic diagram of a winding of the permanent magnet motor according to the embodiment shown in FIG. 2.
Figure 8:
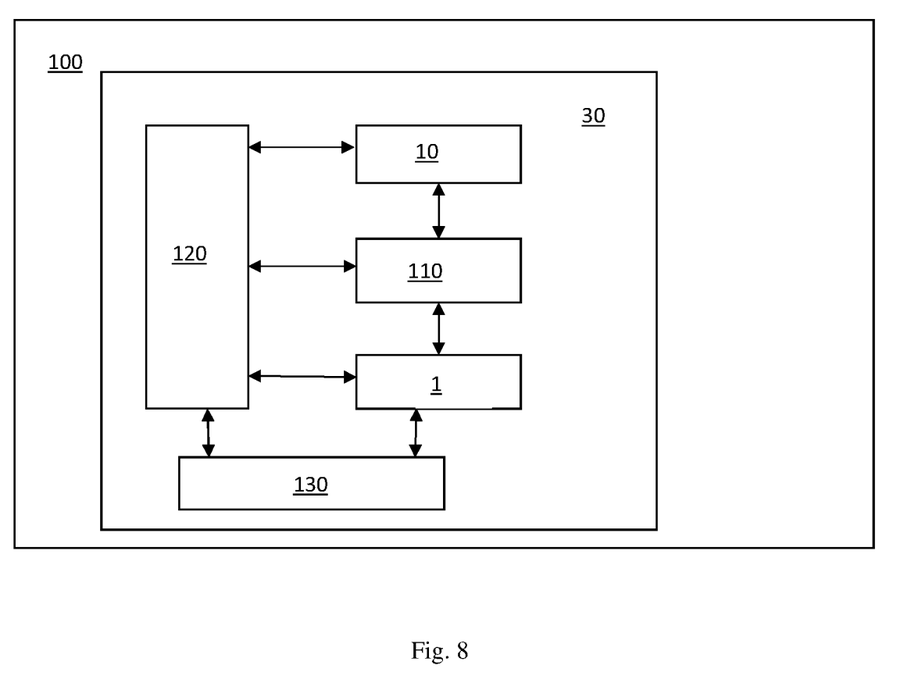
FIG. 8 is a schematic block diagram of a refrigeration device according to another exemplary embodiment of the present disclosure.

As shown in FIGS. 1 to 3, a compressor 1, according to an exemplary embodiment of the present disclosure, is used with a refrigeration device 100 (shown in FIG. 8). The refrigeration device includes a coupling assembly 110 and a frequency converter 10 connected to one end of the coupling assembly. The compressor 1 includes a first shell. The compressor 1 further includes a permanent magnet motor 20 that is set in the first shell and connected to the other end of the coupling assembly. The permanent magnet motor 20 has a critical rotation speed designated by n0. The permanent magnet motor 20 further includes a plurality of poles, and the number of the poles is designated by P. The permanent magnet motor 20 has a winding 206. When the winding 206 of the permanent magnet motor 20 is in a star connection, a busbar voltage of the frequency converter 10 is designated by Udc, a no-load back-EMF coefficient of the permanent magnet motor 20 is designated by E0, when a preset rotation speed of the permanent magnet motor 20 is set to n1, a direct axis inductance of the permanent magnet motor 20 is designated by Ld, and an output current of the frequency converter 10 is designated by I1, a relationship between the E0, the P, the I1, the Ld, the n1, and the Udc satisfies $(E0-P \times I1 \times Ld) \times n1 \geq 0.6\ Udc$, wherein $n1 < n0$, and $n0 - n1 \leq 1$ r/s. When the winding 206 of the permanent magnet motor 20 is in the star connection, a rotation speed of the permanent magnet motor 20 is less than the n0.

The critical rotation speed of the permanent magnet motor 20 of the compressor 1 provided by the present disclosure is n0. When the winding 206 of the permanent magnet motor 20 is in the star connection, the rotation speed of the permanent magnet motor 20 is less than n0. When the winding 206 of the permanent magnet motor 20 is in an angle connection, the rotation speed of the permanent magnet motor 20 is greater than n0. Under the premise that the winding 206 of the permanent magnet motor 20 is in the angle connection, by properly setting a relationship between the E0, the P, the I1, the Ld, the n1 and the Udc to enable these parameters to satisfy $(E0-P \times I1 \times Ld) \times n1 \geq 0.6\ Udc$, the permanent magnet motor 20 can achieve high efficiency performance at both low speeds and high speeds. As a result, the purpose of higher performance of the product in the entire frequency band can be achieved. Furthermore, by properly setting the preset rotation speed n1, the relationship between the critical rotation speed n0 and the rotation speed n1 can satisfy $n1 < n0$, and $n0 - n1 \leq 1$ r/s. When the rotation speed n1 is close to the critical rotation speed n0, the permanent magnet motor 20 with the winding 206 in the star connection mode has a certain field weakening angle, and the performance of the permanent magnet motor 20 decreases as the rotation speed increases. When the rotation speed of permanent magnet motor 20 is greater than the critical rotation speed n0 and is very close to the critical rotation speed n0, the permanent magnet motor 20 with the winding 206 in an angle connection mode has a weak magnetic field, and the performance of the permanent magnet motor 20 increases as the rotation speed increases. As a result, it can be ensured that, near the critical speed n0, the permanent magnet motor 20 has a certain depth of the weak magnetic field when the winding 206 is in the star connection; and it can be also ensured that, near the critical speed n0, the permanent magnet motor 20 has a certain range, in which the rotation speed of the permanent magnet motor 20 increases without causing magnetic field weakening, when the winding 206 is in the angle connection. Thus, if it is desirable to switch the connection mode of the winding 206 of the permanent magnet motor 20, the switching operation is smoother, the impact can be greatly reduced, the transition is more stable, the product's operating energy efficiency is improved, and the product's performance and market competitiveness are improved. For example, the unit of the critical rotation speed n0 is rps, the unit of the busbar voltage Udc is V, the unit of the no-load back-EMF coefficient E0 is V/rps, the unit of the preset rotation speed n1 is rps, the unit of the direct axis inductance Ld is H, and the unit of the output current I1 is A.

Figure 4:
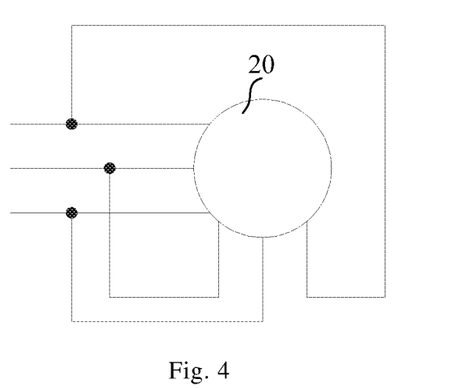
FIG. 4 is a structural schematic diagram of an external wiring of the permanent magnet motor according to an exemplary embodiment of the present disclosure.
Figure 5:
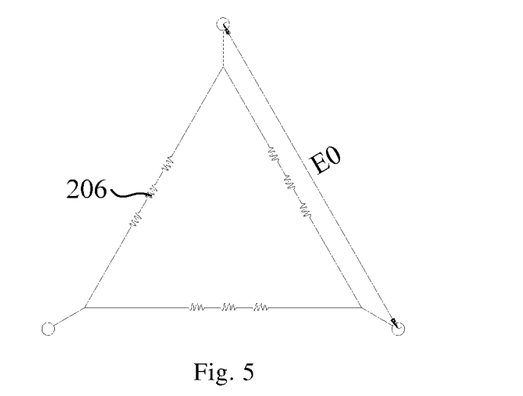
FIG. 5 is a structural schematic diagram of a winding of the permanent magnet motor according to the embodiment shown in FIG. 4.

In the exemplary embodiment shown in FIG. 1, the number of selector switches 40 can be 6, namely S1, S2, S3, S4, S5 and S6. The permanent magnet motor 20 is powered by the frequency converter 10, and 6 selector switches 40 are set in the coupling assembly. As shown in FIGS. 2 and 3, when S1, S2, and S3 are on, and S4, S5, and S6 are off, the winding 206 of the permanent magnet motor 20 is in the star connection. As shown in FIGS. 4 and 5, when S1, S2 and S3 are off, S4, S5 and S6 are on, the winding 206 of the permanent magnet motor 20 is in the angle connection.

In one embodiment of the present disclosure, optionally, a value range of the n0 is n0≥40 r/s.

In the embodiment, by properly setting the value range of the critical rotation speed n0 to n0≥40 r/s, when the rotation speed of the permanent magnet motor 20 is within the critical rotation speed n0, the efficiency of the star connection winding 206 of permanent magnet motor 20 is in a declining mode, and the efficiency of the angle connection winding 206 of the permanent magnet motor 20 is in a rising mode, thereby ensuring that the product has higher performance in the entire frequency band. At the same time, if the winding 206 connection method of the permanent magnet motor 20 is switched in the above region, the switching is smoother, the impact can be greatly reduced, the transition is more stable, the product's operating energy efficiency is improved, and the product's performance and market competitiveness are improved.

In the embodiment, optionally, the permanent magnet motor 20 is a three-phase permanent magnet motor.

In the embodiment, the permanent magnet motor 20 is not limited to three-phase permanent magnet motors, but may also be other multi-phase permanent magnet motors.

Figure 6:
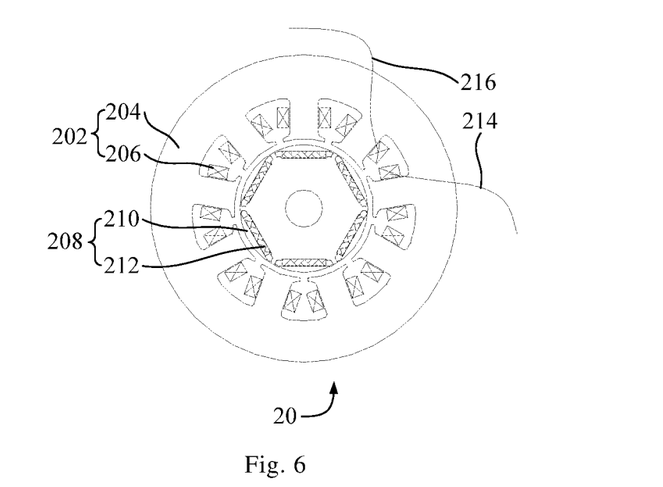
FIG. 6 is a cross-sectional view of the permanent magnet motor according to an exemplary embodiment of the present disclosure.

In one embodiment of the present disclosure, optionally, as shown in FIG. 6, the permanent magnet motor 20 includes: a stator 202 being provided with a stator core 204 and the winding 206 being wound on the stator core 204; and a rotor 208 being provided in a mounting chamber of the stator 202, and provided with a rotor core 210 and a permanent magnet 212 being located on the rotor core 210.

In the embodiment, the stator 202 includes a the stator core 204 and the winding 206, by winding the winding 206 wound on the stator core 204. The stator 202 is stationary when the compressor 1 is running. When the current passes through the winding 206, the stator 202 generates a magnetic field. The rotor 208 includes a rotor core 210 and a permanent magnet 212. The magnetic pole of the permanent magnet 212 does not change, by setting the permanent magnet 212 on the rotor core 210. When the compressor 1 is working, the rotor 208 is set in the mounting chamber of the stator 202, the stator 202 generates a rotating magnetic field, and the rotor 208 is cut by the magnetic field lines in the rotating magnetic field to generate output current, which provides power for the operation of the compressor 1.

In one embodiment of the present disclosure, optionally, the winding 206 of the stator 202 can be a three-phase stator winding. The sub-winding 206 of each phase of the stator 202 includes a head joint 214 and a tail joint 216. All the head joints 214 are connected to one terminal of the compressor 1. All the tail joints 216 are connected to the other terminal of the compressor 1.

In the embodiment, the sub-winding 206 of each phase of the stator 202 includes the head joint 214 and the tail joint 216. All the head joints 214 of the three-phase stator winding are connected to one terminal of the compressor 1, and all the tail joints 216 of the three-phase stator winding are connected to the other terminal of the compressor 1, so that the coupling assembly is connected to the two terminals of the compressor 1 respectively. In this way, through the different actions of the coupling assembly, different connection modes of the winding 206 can be achieved, such as the star connection and the angle connection.

In exemplary embodiments, the permanent magnet 212 can be a rare earth permanent magnet, or the permanent magnet 212 can be a ferrite permanent magnet.

In exemplary embodiments, the rotor core 210 can include slots, and the number of slots is at least one, all the slots are distributed at intervals along the circumferential direction of the rotor core 210, and the permanent magnets 212 are arranged in the slots, respectively. By processing slots on the rotor core 210, it is possible to provide an installation position for the permanent magnet 212, which facilitates the positioning and assembling of the permanent magnet 212. At the same time, the structure has fewer processing steps and lower processing requirement, lower production cost and it is convenient to mass produce.

In exemplary embodiments, the permanent magnet 212 is cylindrical, and the permanent magnet 212 is sleeved on the outer wall of the rotor core 210. The permanent magnet 212 is sleeved on the outer wall of the rotor core 210, and the rotor core 210 plays a supporting role, which facilitates the positioning and assembling of the permanent magnet 212. At the same time, the structure has fewer processing steps, lower processing requirement, lower production cost, and it is convenient to mass produce.

In exemplary embodiments, as shown in FIG. 6, the permanent magnet motor 20 is a 9-slot 6-pole structure. Taking each phase of the winding 206 in series-connected as an example, each phase of the winding 206 has the head joint 214 and the tail joint 216, and the head joint 214 and the tail joint 216 are connected to the lead wires respectively. According to the actual application, the number of connectors for each phase of the winding 206 can also be 2k (k=1, 2 . . . ).

Figure 7:
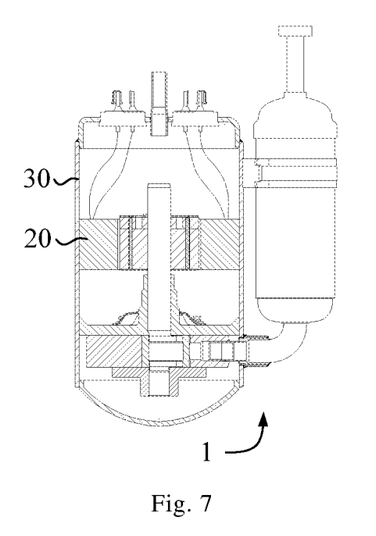
FIG. 7 is a cross-sectional view of a compressor according to an exemplary embodiment of the present disclosure.

As shown in FIG. 7 and FIG. 8, the second aspect of the present disclosure provides a refrigeration device 100. The refrigeration device includes a second shell 30; a frequency converter 10 being set in the second shell 30; the compressor 1 being provided in the second shell 30; a coupling assembly 110 being provided in the second shell 30 and connected with the frequency converter 10 and the compressor 1 respectively; and a controller 120 being set in the second shell 30 and connected with the coupling assembly, the frequency converter 10 and the compressor 1. The controller 120 is configured to control the frequency converter 10 and the compressor 1, so that a relationship between the E0, the P, the I1, the Ld, the n1 and the Udc satisfies (E0−P×I1×Ld)×n1≥0.6 Udc.

The refrigeration device provided by the present disclosure includes: the second shell 30, the frequency converter 10, the compressor 1, the coupling assembly and the controller. By setting the controller to make enable the winding 206 of the permanent magnet motor 20 to be in the star connection, the controller controls the frequency converter 10 and the compressor 1, so that a relationship between the E0, the P, the I1, the Ld, the n1 and the Udc satisfies (E0−P×I1×Ld)×n1≥0.6 Udc, thereby Therefore, it can be ensued ensuring that when the rotation speed of the permanent magnet motor 20 is very close to the critical rotation speed, the permanent magnet motor 20 with the star connection of the winding 206 has a certain field weakening depth, and the permanent magnet motor 20 with the angle connection of the winding 206 does not enter the field weakening region, thereby ensuring that the product has high performance in the entire frequency band, and the switching of the winding 206 connection mode of the permanent magnet motor 20 has no stagnation, and the switching transition is smoother, ensuring the smoothness of the transition.

In one embodiment of the present disclosure, optionally, as shown in FIG. 1, when an input current of the frequency converter 10 is AC, the frequency converter 10 includes a rectifier 102, and an inverter 104 being connected with the rectifier 102.

In the embodiment, the composition of the frequency converter 10 is determined according to the characteristics of the input current of the frequency converter 10. When the input current of the frequency converter 10 is AC, the frequency converter 10 includes the rectifier 102 and the inverter 104. After the input current of the frequency converter 10 is filtered by the rectifier 102, the AC is converted into DC, and the DC is the power supplied to the inverter 104.

In one embodiment of the present disclosure, optionally, when the input current of the frequency converter 10 is DC, the frequency converter 10 includes the inverter 104.

In the embodiment, the composition of the frequency converter 10 is determined according to the characteristics of the input current of the frequency converter 10. When the input current of the frequency converter 10 is DC, the frequency converter 10 includes the inverter 104. The inverter 104 is used to convert DC power to AC power.

In one embodiment of the present disclosure, optionally, as shown in FIG. 1, the coupling assembly includes a selector switch 40 being used to switch the winding 206 of the permanent magnet motor 20 between the star connection and the angle connection.

In the embodiment, by setting the selector switch 40 on or off, the connection state of the winding 206 of the permanent magnet motor 20 to the frequency converter 10 can be selectively achieved. Thus, the winding 206 of the permanent magnet motor 20 can be set in the star connection or the angle connection. At the same time, the structure setting is convenient for processing, installation and subsequent disassembly and replacement, and thus has strong interchangeability.

In one embodiment of the present disclosure, optionally, the refrigeration device can further include a detection device 130 (shown in FIG. 8) being provided in the second shell 30 and connected with the controller and the compressor 1.

In the embodiment, by setting the detection device in the second shell 30 and using the detection device to detect the rotation speed of the permanent magnet motor 20 in real time, real-time data can be provided for the controller to determine whether the rotation speed of the permanent magnet motor 20 reaches the preset rotation speed n1, which allows the controller to accurately and timely control the movement of other components, thereby ensuring the reliability and accuracy of product use.

In the description of the present disclosure, the term "plurality" refers to two or more, unless explicitly defined otherwise. The terms "mounting", "connected", "connection", "fixing" and the like should be understood in a broad sense. For example, "connection" may be a fixed connection, a removable connection or an integral connection; and "connected" may be a direct connection and may be an indirect connection through an intermediary. A person of ordinary skills in the art could understand the specific meaning of the terms in the present disclosure according to specific situations.

In the description of the present specification, the descriptions of the terms "one embodiment", "some embodiments" and "specific embodiments" and the like mean that specific features, structures, materials or characteristics described in conjunction with the embodiment(s) or example(s) are included in at least one embodiment or example of the present disclosure. In the specification, the schematic representation of the above terms does not necessarily refer to the same embodiment or example. Moreover, the particular features, structures, materials or characteristics described may be combined in a suitable manner in any one or more embodiments or examples.

The descriptions above are only exemplary embodiments of the present disclosure, which are not used to limit the present disclosure. For a person skilled in the art, the present disclosure may have various changes and variations. Any modifications, equivalent substitutions, improvements etc. within the spirit and principle of the present disclosure shall all be included in the protection scope of the present disclosure.

What is claimed is:

1. A compressor for a refrigeration device, the refrigeration device comprising a coupler and a frequency converter connected to one end of the coupler, the compressor comprising:
 a permanent magnet motor being connected to the other end of the coupler;
 wherein:
 a critical rotation speed of the permanent magnet motor is n0;
 a number of poles of the permanent magnet motor is P;
 the permanent magnet motor comprises a winding, when the winding of the permanent magnet motor is in a star connection,
 a busbar voltage of the frequency converter is Udc,
 a no-load back-EMF coefficient of the permanent magnet motor is E0,
 when a preset rotation speed of the permanent magnet motor is n1, a direct axis inductance of the permanent magnet motor is Ld, and an output current of the frequency converter is I1,
 a relationship between the E0, the P, the I1, the Ld, the n1, and the Udc satisfies (E0−P×I1×Ld)×n1≥0.6 Udc,
 wherein n1<n0, and n0−n1≤1 rps; and
 when the winding of the permanent magnet motor is in the star connection, a rotation speed of the permanent magnet motor is less than the n0.

2. The compressor according to claim 1, wherein a value range of the n0 is n0≥40 rps.

3. The compressor according to claim 1, wherein the permanent magnet motor comprises a three-phase permanent magnet motor.

4. The compressor according to claim 1, wherein the permanent magnet motor comprises:
a stator comprising: a stator core, and the winding being wound on the stator core; and
a rotor being provided in a mounting chamber of the stator, and comprising a rotor core and a permanent magnet on the rotor core.

5. The compressor according to claim 4, wherein the winding of the stator comprises a three-phase stator winding,
the three-phase stator winding comprises a sub-winding for each phase of the stator, and
each sub-winding comprises a head joint and a tail joint, all the head joints are connected to one terminal of the compressor, and all the tail joints are connected to the other terminal of the compressor.

6. A refrigeration device comprises:
a coupler and a frequency converter connected to one end of the coupler;
a compressor comprising a permanent magnet motor connected to the other end of the coupler;
wherein:
a critical rotation speed of the permanent magnet motor is n0,
a number of poles of the permanent magnet motor is P,
the permanent magnet motor comprises a winding,
when the winding of the permanent magnet motor is in a star connection, a busbar voltage of the frequency converter is Udc, and a no-load back-EMF coefficient of the permanent magnet motor is E0, and
when a preset rotation speed of the permanent magnet motor is n1, a direct axis inductance of the permanent magnet motor is Ld, and an output current of the frequency converter is I1;
a shell, wherein the compressor is provided in the shell;
the frequency converter being set in the shell;
the coupler being provided in the shell and connected with the frequency converter and the compressor, respectively; and
a controller being provided in the shell and connected with the coupler, the frequency converter and the compressor,
wherein the controller is configured to control the frequency converter and the compressor, so that a relationship between the E0, the P, the I1, the Ld, the n1 and the Udc satisfies the (E0−P×I1×Ld)×n1≥0.6 Udc, wherein n1<n0, and n0−n1≤1 rps.

7. The refrigeration device according to claim 6, wherein when an input current of the frequency converter is AC, the frequency converter comprises:
a rectifier; and
an inverter being connected with the rectifier.

8. The refrigeration device according to claim 6, wherein when an input current of the frequency converter is DC, the frequency converter comprises an inverter.

9. The refrigeration device according to claim 6, wherein the coupler comprises:
a selector switch being used to switch the winding of the permanent magnet motor between the star connection and an angle connection.

10. The refrigeration device according to claim 6, further comprising:
a speed detector being provided in the shell and connected with the controller and the compressor.

* * * * *